(12) United States Patent
Donovan

(10) Patent No.: US 9,651,273 B2
(45) Date of Patent: May 16, 2017

(54) PROGRAMMABLE THERMOSTAT FOR A ROOM

(71) Applicant: Daniel Donovan, North Andover, MA (US)

(72) Inventor: Daniel Donovan, North Andover, MA (US)

(73) Assignee: Daniel Donovan, Andover, MA (US)

( * ) Notice: Subject to any disclaimer, the term of this patent is extended or adjusted under 35 U.S.C. 154(b) by 242 days.

(21) Appl. No.: 14/724,842

(22) Filed: May 29, 2015

(65) Prior Publication Data

US 2015/0345816 A1     Dec. 3, 2015

Related U.S. Application Data

(60) Provisional application No. 62/005,060, filed on May 30, 2014.

(51) Int. Cl.
| | |
|---|---|
| *B60H 1/00* | (2006.01) |
| *F24F 11/00* | (2006.01) |
| *F24F 3/044* | (2006.01) |
| *G05B 19/042* | (2006.01) |
| *G05D 23/19* | (2006.01) |

(52) U.S. Cl.
CPC ............ *F24F 11/006* (2013.01); *F24F 3/044* (2013.01); *F24F 11/0012* (2013.01); *F24F 11/0086* (2013.01); *G05B 19/0426* (2013.01); *G05D 23/1904* (2013.01); *F24F 2011/0013* (2013.01); *F24F 2011/0016* (2013.01); *F24F 2011/0056* (2013.01); *F24F 2011/0067* (2013.01); *F24F 2011/0068* (2013.01); *F24F 2011/0091* (2013.01); *G05B 2219/23122* (2013.01); *G05B 2219/2614* (2013.01)

(58) Field of Classification Search
CPC .. F24F 11/006; F24F 11/0012; F24F 11/0086; F24F 3/044; F24F 2011/0016; F24F 2011/0013; F24F 2011/0056; F24F 2011/0091; F24F 2011/0067; F24F 2011/0068; G05D 23/1904; G05B 19/0426; G05B 2219/23122; G05B 2219/2614
USPC ......................................... 165/205, 209, 212
See application file for complete search history.

(56) References Cited

U.S. PATENT DOCUMENTS

| | | |
|---|---|---|
| 5,381,950 A | 1/1995 | Aldridge |
| 7,156,316 B2 | 1/2007 | Kates |
| 7,448,435 B2 | 11/2008 | Garozzo |

(Continued)

*Primary Examiner* — Len Tran
*Assistant Examiner* — Claire Rojohn, III

(57) ABSTRACT

A programmable room thermostat adjusts heating and cooling distribution based on one or more pre-selected temperatures, also controls appliances such as entertainment systems and lights, and may be powered by replaceable batteries or household current. The room thermostat monitors the air temperature in the room, which is defined as a zone, and determines whether heating or cooling is needed. Programmable settings for the room thermostat accommodate 24-hour and seven-day cycles, and are capable of applying the user's preferences based on the time of day and the day of the week. When the room reaches the desired temperature, the room thermostat signals a central thermostat to close the damper. The settings of each room thermostat in the home or office may be controlled and adjusted via the user's smartphone or other mobile electronic device.

12 Claims, 3 Drawing Sheets

(56) References Cited

U.S. PATENT DOCUMENTS

| | | | |
|---|---|---|---|
| 8,090,477 B1* | 1/2012 | Steinberg | G05D 23/1923 |
| | | | 700/276 |
| 8,532,827 B2* | 9/2013 | Stefanski | G05D 23/1902 |
| | | | 236/91 R |
| 8,990,718 B2* | 3/2015 | Thorson | B60H 1/00985 |
| | | | 236/1 R |
| 9,134,710 B2* | 9/2015 | Cheung | G05B 13/0245 |
| 9,435,560 B2* | 9/2016 | Kobayashi | F24F 11/006 |
| 9,471,946 B1* | 10/2016 | Keil | G06Q 50/06 |
| 9,535,411 B2* | 1/2017 | Wei | G05B 19/02 |
| 2010/0070089 A1* | 3/2010 | Harrod | F24F 11/0086 |
| | | | 700/277 |
| 2013/0211783 A1* | 8/2013 | Fisher | G06F 11/30 |
| | | | 702/182 |
| 2014/0031990 A1* | 1/2014 | Filbeck | F24F 11/006 |
| | | | 700/276 |

* cited by examiner

PROGRAMMABLE THERMOSTAT FOR A ROOM

CROSS-REFERENCE TO RELATED APPLICATIONS

This Application claims the benefit of U.S. Provisional Application No. 62/005,060, filed May 30, 2014, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to energy conservation equipment, and in particular to a programmable room thermostat. The Internet and SMS texting, coupled with the development of computers that are small, inexpensive, and powerful, have opened many possibilities for both communication and automation. Any accessory which can help us conserve energy and make our lives easier can operate automatically and be controlled from a distance. Several inventions have been developed that will automate the temperature control and electric appliances of a home or office, but each has proven less than satisfactory in its own way. In particular, such devices fail to individually control the temperature and appliances in each room to correspond with the schedules and activities of its occupants. A programmable room thermostat, which controls heating and cooling in an individual room as well as activating and deactivating its appliances, and may itself be controlled by a user via a mobile electronic device, would resolve this problem.

SUMMARY OF THE INVENTION

Accordingly, the invention is directed to a programmable room thermostat. The room thermostat adjusts heating and cooling distribution based on one or more pre-selected temperatures, also controls electronic devices such as appliances, entertainment systems and lights. The room thermostat may be powered by replaceable batteries or household current. The room thermostat monitors the air temperature in the room, which is defined as a zone, and determines whether heating or cooling is needed. Programmable settings for the room thermostat accommodate 24-hour and seven-day cycles, and are capable of applying the user's preferences based on the time of day and the day of the week. When the room reaches the desired temperature, the room thermostat signals a central thermostat to close the electronically controlled vent. The settings of each room thermostat in the home or office may be controlled and adjusted via the user's smartphone or other mobile electronic device.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION OF THE INVENTION

Figure 1:
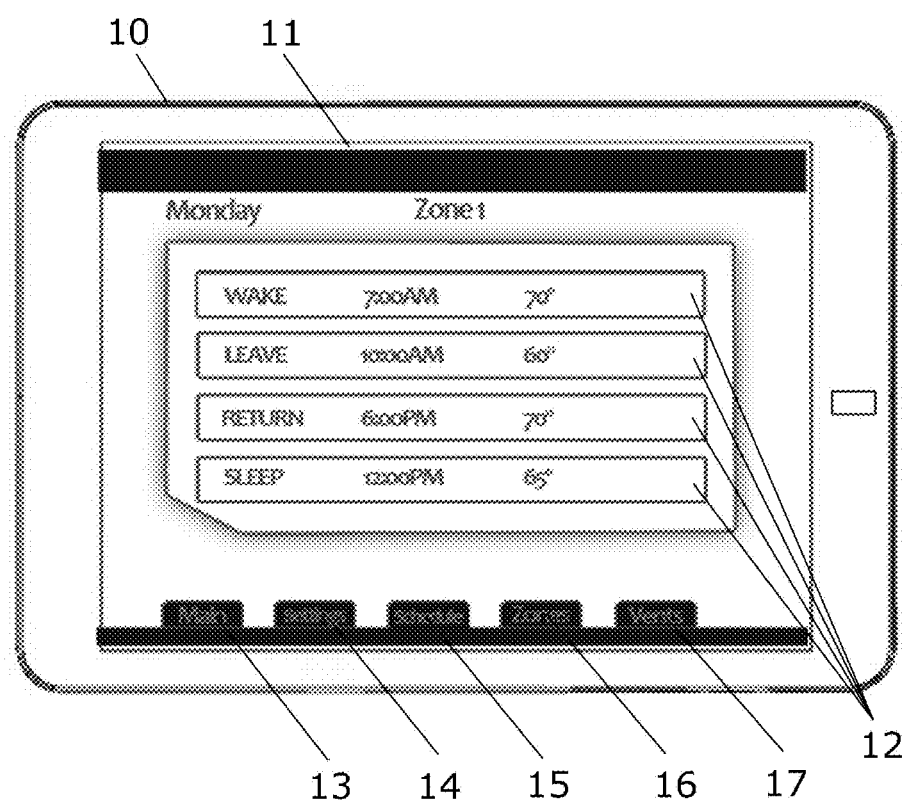
FIG. 1 is a front view of the central thermostat component of the first exemplary embodiment with the schedule displayed, displaying the central thermostat 10, the central thermostat visual display 11, the period settings 12, the main tab 13, the settings tab 14, the schedule tab 15, the zones tab 16, and the vents tab 17.
Figure 2:
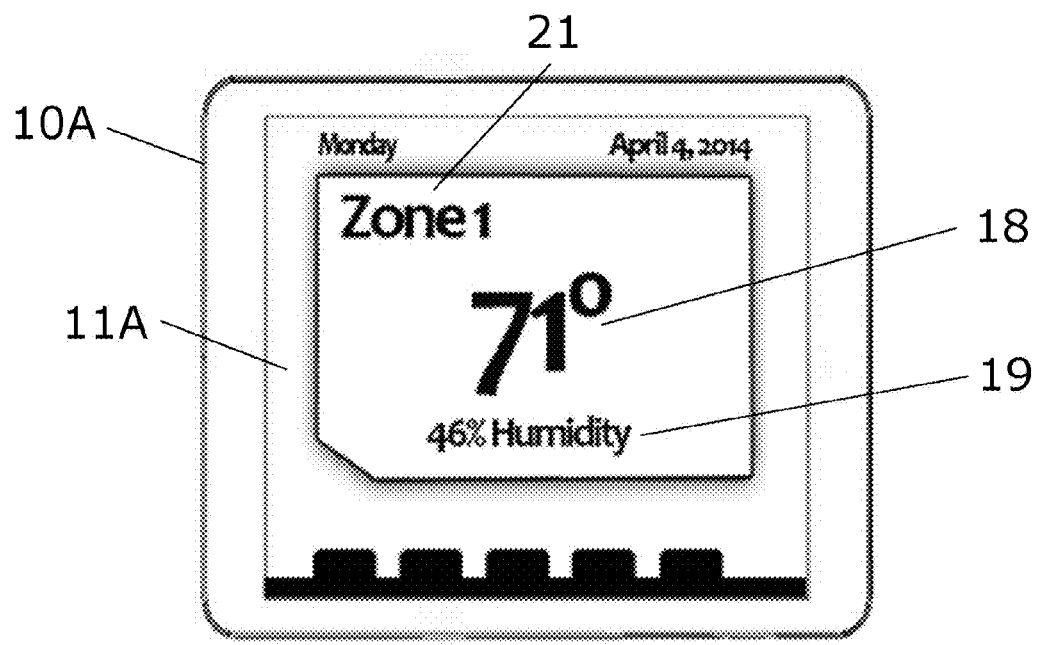
FIG. 2 is a front view of the room thermostat component of the first exemplary embodiment with the main screen displayed, displaying the room thermostat 10A, the room thermostat visual display 11A, the temperature display 18, the humidity display 19, and the zone 21.
Figure 3:
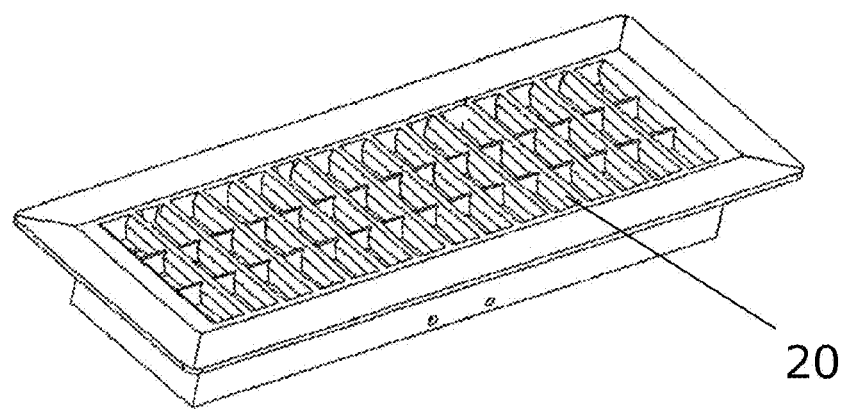
FIG. 3 is a top perspective view of the floor vent component of the first exemplary embodiment, displaying the floor vent 20.
Figure 4:
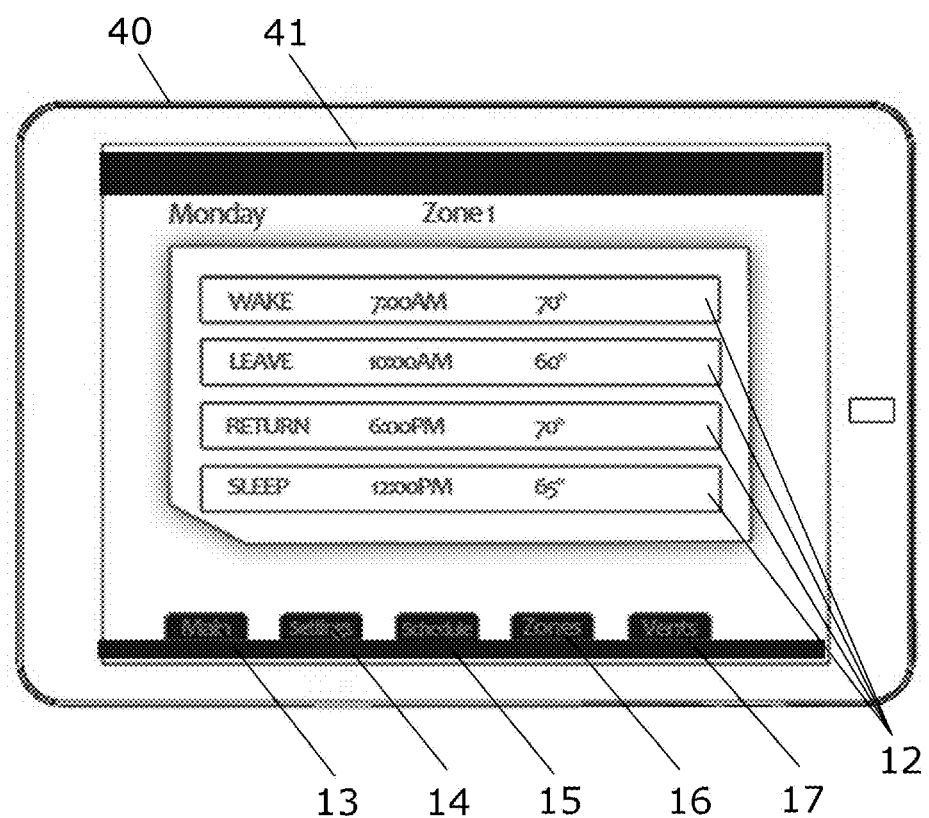
FIG. 4 is a front view of the mobile electronic device component of the first exemplary embodiment with the schedule displayed, displaying the mobile electronic device 40, the mobile electronic device visual display 41, the period settings 12, the main tab 13, the settings tab 14, the schedule tab 15, the zones tab 16, and the vents tab 17.

Referring now to the invention in more detail, the invention is directed to a programmable room thermostat 10A. The room thermostat 10A adjusts heating and cooling distribution based on one or more pre-selected temperatures, also controls electronic devices such as appliances, entertainment systems, and lights, and may be powered by replaceable batteries or household current. The room thermostat 10A monitors the air temperature in the room, which is defined as a zone 21, and determines whether heating or cooling is needed. Programmable settings for the room thermostat 10A accommodate 24-hour and seven-day cycles, and are capable of applying the user's preferences based on the time of day and the day of the week. When the room reaches the desired temperature, the room thermostat 10A signals a central thermostat 10 to close the electronically controllable vent 20. The settings of each room thermostat 10A in the home or office may be controlled and adjusted via the user's smartphone or other mobile electronic device 40.

The first exemplary embodiment provides a plurality of room thermostats 10A which may be powered by replaceable batteries or household current. The front surface of each room thermostat 10A comprises a visual display 11 with touchscreen capability, including a digital 10-key keypad for setting preferred temperatures. Five tabs are visible across the lower edge of the visual display 11: the main tab 13, the settings tab 14, the schedule tab 15, the zones tab 16, and the vents tab 17. Tapping on each tab opens a corresponding screen on the visual display 11.

The main screen, which is accessed via the main tab 13, displays an outside temperature display 18, and an outside humidity display 19, with data provided by sensors located on the edges of the room thermostat 10A. The settings screen, which is accessed via the settings tab 14, provides a schedule for the activation and deactivation of the various electronic devices such as appliances and fixtures in the zone 21. Electronic devices may be lights, a refrigerator, or a home entertainment system.

The schedule screen, which is accessed via the schedule tab 15, provides a schedule for the control of the air temperature in the zone 21. The default settings of the schedule provide four periods in each 24-hour day, separated by four thresholds, which are identified as "Wake," "Leave," "Return," and "Sleep." More or fewer periods and thresholds, as well as different titles for the threshold events such as "Work" or "Walk Dog," are contemplated and may be customized by the user as desired. Each of the periods corresponds to a desired air temperature in the zone 21 for that period.

The zones screen, which is accessed via the zones tab 16, provides a list of all the zones 21 in the home or office, with default titles such as "Kitchen" and "Bedroom 1" which may be customized by the user as desired. The current temperature and humidity of each zone 21 are also provided on the list. The vents screen, which is accessed via the vents tab 17, individually controls the dampers in floor vents 20, wall vents, baseboard registers, and ceiling vents in the zone 21, via servomotors, which may be powered by batteries or household current.

The central thermostat 10 operates in much the same manner as a room thermostat 10A, with a larger visual display 11. In addition to all of the functions provided by the room thermostats 10A, the central thermostat 10 provides an on-screen digital keyboard for changing the names of zones 21 and threshold events. The central thermostat 10 may also be synchronized with other devices, such as a remote starter for a vehicle, a home security system, or electric door locks.

Electronic components of the system preferably include an internal antenna, a transmitter and a receiver in each room thermostat 10A and in the central thermostat 10 which employ WiFi™, Bluetooth™ or another medium-range wireless communications protocols. Corresponding receivers and internal antennas are provided in the vents to control the servomotors. The room thermostats 10A and the central thermostat 10 also provide a microprocessor, a memory device, and a computer program to operate the system. A mobile application is available to be downloaded to the user's smartphone, tablet, or other mobile electronic device 40 for operation of the system.

To use the first exemplary embodiment, the user downloads the mobile application to the user's mobile electronic device 40 and synchronizes the central thermostat 10 with the mobile electronic device 40. The user may then change the default settings for each zone 21 as desired.

The central thermostat 10, the room thermostats 10A, the floor vents 20, the wall vents, the ceiling vents, and the baseboard vents are preferably manufactured from rigid, durable materials, such as steel, aluminum alloy, or plastic. The central thermostat visual displays 11, the room thermostat visual display 11A, and the mobile electronic device visual display 41 are preferably manufactured from a rigid, durable material which is transparent, such as plastic or acrylic polymer. The antennas, the microprocessors, the memory devices, and the servomotors are preferably manufactured from rigid, durable materials such as steel and aluminum alloy. Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A programmable room thermostat, comprising: a central thermostat; said central thermostat further comprising a central thermostat visual display, a central thermostat user input, a central thermostat keyboard, a central thermostat temperature sensor; said central thermostat visual display having touchscreen capability; said central thermostat visual display displaying a central thermostat plurality of tabs; said central thermostat plurality of tabs comprising a main tab, a settings tab, a schedule tab, a zone tab, and a vents tab; said central thermostat user input being configured for allowing a specification of a desired room temperature for one or more zones, and for controlling at least one electronic device in each of said one or more zones; at least one room thermostat; said at least one room thermostat further comprising a room thermostat visual display, a room thermostat user input, a room thermostat keyboard, and a room thermostat temperature sensor; said room thermostat visual display having touchscreen capability; said room thermostat visual display displaying a room thermostat plurality of tabs; said room thermostat plurality of tabs comprising a main tab, a settings tab, a schedule tab, a zone tab, and a vents tab; said room thermostat user input being configured for the specification of a desired room temperature, and for controlling at least one electronic device; at least one vent; said at least one vent being configured for electromechanically closing and opening; said at least one vent being configured for remote electronic control; said central thermostat being in wireless electronic communication with said at least one room thermostat and said at least one vent; each of said at least one room thermostat being configured for monitoring temperature in one of said one or more zones; each of said at least one one vent being located in one of said one or more zones; and said central thermostat being configured for controlling said at least one vent in response to temperature in that of said one or more zones where each of said at least one vent is boated, wherein said central thermostat is synchronized with a software application on a mobile electronic device, wherein said mobile electronic device further comprising a mobile electronic device visual display, a mobile electronic device user input, and a mobile electronic device keyboard, wherein said mobile electronic device visual display displaying a mobile electronic device plurality of tabs, wherein said mobile electronic device plurality of tabs comprising a main tab, a settings tab, a schedule tab, a zone tab, and a vents tab.

2. The programmable room thermostat of claim 1 wherein said main tab displays an outside temperature and an outside humidity.

3. The programmable room thermostat of claim 1 wherein said settings tab provides a display of a schedule of activations and deactivations of various electronic appliances and fixtures and a user input for controlling and scheduling activation and deactivation of various electronic appliances and fixtures.

4. The programmable room thermostat of claim 1 wherein said schedule tab provides a display of a schedule for controlling air temperature in each of said one or more zones and a user input for controlling and scheduling air temperature in each of said one or more zones.

5. The programmable room thermostat of claim 1 wherein said zone tab provides a display of information for each room or zone and a user input for controlling and scheduling each of said one or more zones.

6. The programmable room thermostat of claim 1 wherein said vents tab provides a display of one or more vents and a user input for controlling opening and closing of one or more vents.

7. The programmable room thermostat of claim 1 wherein said mobile electronic device visual display having touchscreen capability.

8. The programmable room thermostat of claim 1 wherein said main tab displays an outside temperature and an outside humidity.

9. The programmable room thermostat of claim 1 wherein said settings tab provides a display of a schedule of activations and deactivations of various electronic appliances and fixtures and a user input for controlling and scheduling activation and deactivation of various electronic appliances and fixtures.

10. The programmable room thermostat of claim 1 wherein said schedule tab provides a display of a schedule for controlling air temperature in each of said one or more zones and a user input for controlling and scheduling air temperature in each of said one or more zones.

11. The programmable room thermostat of claim 1 wherein said zone tab provides a display of information for each of said one or more zones and a user input for controlling and scheduling each of said one or more zones.

12. The programmable room thermostat of claim 1 wherein said vents tab provides a display of one or more vents and a user input for controlling opening and closing of one or more vents.

* * * * *